UNITED STATES PATENT OFFICE.

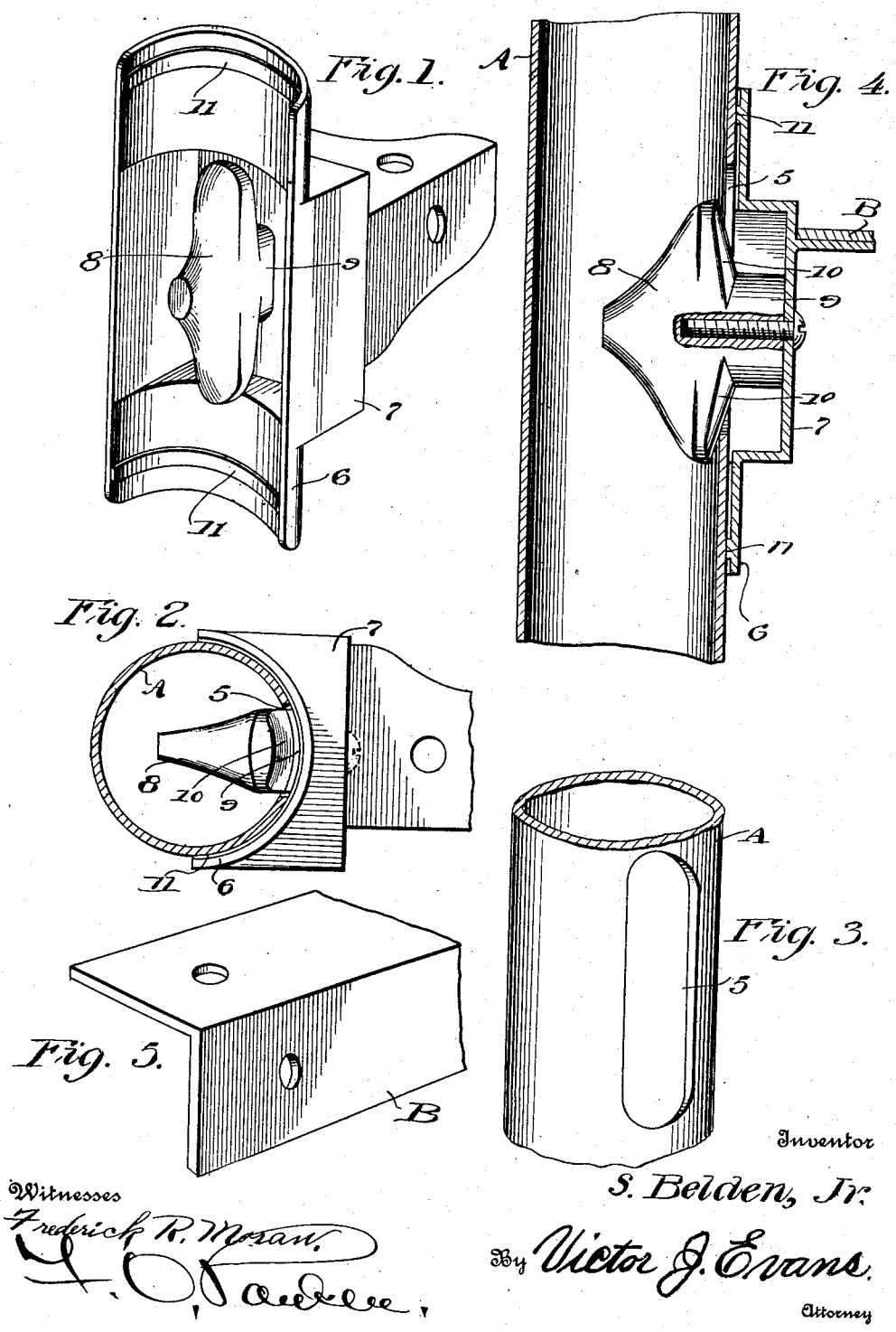

SIMEON BELDEN, JR., OF BIRMINGHAM, ALABAMA.

CORNER-FASTENING FOR DISPLAY-RACKS.

1,190,088.  Specification of Letters Patent.  Patented July 4, 1916.

Application filed May 20, 1914. Serial No. 839,870.

*To all whom it may concern:*

Be it known that I, SIMEON BELDEN, Jr., a citizen of the United States, residing at Birmingham, in the county of Jefferson and State of Alabama, have invented new and useful Improvements in Corner-Fastenings for Display-Racks, of which the following is a specification.

The invention relates to corner fastenings for display racks or other appliances including hollow corner posts and cross rails, and it has for its primary object to provide a fastener of this character wherein the cross rail can be firmly connected to the corner post and the said rail can be detached therefrom in a ready and quick manner.

Another object of the invention is the provision of a corner fastener of this character wherein the connected parts will be rigidly held joined together and also which will permit the reversal of the cross connecting rail, and when joined to the corner post will assure rigidity to the display rack or other appliance.

A further object of the invention is the provision of a corner fastener of this character which is extremely simple in construction, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a perspective view of the fastener constructed in accordance with the invention. Fig. 2 is a horizontal section through the corner post, showing the fastener and the rail in top plan. Fig. 3 is a fragmentary perspective view of the corner post. Fig. 4 is a vertical longitudinal sectional view through the corner post and fastener. Fig. 5 is a perspective view of one end of the cross rail.

Similar reference characters indicate corresponding parts throughout the several views in the drawing.

In the accompanying drawing, A designates one of the hollow corner posts of a display rack or other appliance, and B one of the horizontal or cross rails thereof. In the corner post A is formed an elongated or key-hole shaped slot 5 to receive the head member of the fastener on the horizontal or cross rail B.

The fastener comprises a substantially semi-circular or segmental shaped plate 6 having an out-struck boss 7 to which is united the horizontal or cross rail B at the outer face thereof, while swiveled within the hollow portion of the boss 7 is a substantially T-shaped head 8 formed with an oval-shaped outwardly tapered shank 9, the head being of a length corresponding to the length of the slot 5, and is adapted to be passed therethrough so that the shank 9 of the head may freely slide longitudinally of the said slot in the corner post. The head is formed with inwardly beveled surfaces 10 which serve to bind the plate 6 against the corner post A when the head is moved toward either end of the slot 7 in the said post. Suitably secured to the concaved face of the plate 6 in opposite ends thereof are friction strips 11 which frictionally bind against the outer surface of the post when the fastener is locked thereto, and also to prevent the marring of the post.

It is clearly apparent that the rail can be turned over and the fastener engaged in the post for the securing of the said rail thereto.

What is claimed is:—

In a device of the class described, in combination, a hollow corner post, formed with an elongated slot, a substantially semi-circular plate having a back wall, side walls, top and bottom walls, having semi-circular edges, opposing semi-circular flanges formed in a plane with the top and bottom walls of said plate flush with their semi-circular edges, the back wall of said plate being spaced from the line of said flanges, a substantially T-shaped head having a shank and tapering forwardly toward said shank, said shank adapted to bear against the back wall of said plate to properly dispose said head against one edge of said slot, said shank having an elongated internally threaded bore, and a single set screw projecting through the back wall of said plate into said threaded bore and adapted to hold said shank against said back wall.

In testimony whereof I affix my signature in presence of two witnesses.

SIMEON BELDEN, JR.

Witnesses:
J. C. BAM,
E. H. WRENN, Jr.

Copies of this patent may be obtained for five cents each, by addressing the "Commissioner of Patents, Washington, D. C."